(12) United States Patent
Li et al.

(10) Patent No.: US 11,977,634 B2
(45) Date of Patent: May 7, 2024

(54) METHOD AND SYSTEM FOR DETECTING INTRUSION IN PARALLEL BASED ON UNBALANCED DATA DEEP BELIEF NETWORK

(71) Applicant: HUNAN UNIVERSITY, Hunan (CN)

(72) Inventors: Kenli Li, Changsha (CN); Zhuo Tang, Changsha (CN); Qing Liao, Changsha (CN); Chubo Liu, Changsha (CN); Xu Zhou, Changsha (CN); Siyang Yu, Changsha (CN); Liang Du, Changsha (CN)

(73) Assignee: HUNAN UNIVERSITY, Hunan (CN)

( * ) Notice: Subject to any disclaimer, the term of this patent is extended or adjusted under 35 U.S.C. 154(b) by 348 days.

(21) Appl. No.: 17/626,684

(22) PCT Filed: May 17, 2021

(86) PCT No.: PCT/CN2021/094023
§ 371 (c)(1),
(2) Date: Jan. 12, 2022

(87) PCT Pub. No.: WO2022/012144
PCT Pub. Date: Jan. 20, 2022

(65) Prior Publication Data
US 2022/0382864 A1   Dec. 1, 2022

(30) Foreign Application Priority Data
Jul. 17, 2020   (CN) .......................... 202010689950.5

(51) Int. Cl.
*G06F 21/56*   (2013.01)
*G06F 18/23213*   (2023.01)
(Continued)

(52) U.S. Cl.
CPC ...... *G06F 21/566* (2013.01); *G06F 18/23213* (2023.01); *G06N 3/045* (2023.01); *G06N 20/00* (2019.01); *G06F 2221/034* (2013.01)

(58) Field of Classification Search
CPC ............. G06F 21/566; G06F 18/23213; G06F 2221/034; G06N 20/20; G06N 3/045
See application file for complete search history.

(56) References Cited

U.S. PATENT DOCUMENTS 9,798,960 B2   10/2017   Santos et al.
11,816,562 B2 *   11/2023   Burkhart ................ G06N 3/088
(Continued)

FOREIGN PATENT DOCUMENTS

CN   103716204   4/2014
CN   103927874   7/2014
(Continued)

OTHER PUBLICATIONS

David A Cieslak et al, Combating Imbalance in Network Intrusion Datasets, IEEE (Year: 2006).*
(Continued)

*Primary Examiner* — Shanto Abedin
(74) *Attorney, Agent, or Firm* — HSML P.C.

(57) ABSTRACT

The disclosure discloses a method for detecting an intrusion in parallel based on an unbalanced data Deep Belief Network, which reads an unbalanced data set DS; under-samples the unbalanced data set using the improved NCR algorithm to reduce the ratio of the majority type samples and make the data distribution of the data set balanced; the improved differential evolution algorithm is used on the distributed memory computing platform Spark to optimize the parameters of the deep belief network model to obtain the optimal model parameters; extract the feature of data of the data set, and then classify the intrusion detection by the (Continued)

weighted nuclear extreme learning machine, and finally train multiple weighted nuclear extreme learning machines of different structures in parallel by multithreading as the base classifier, and establish a multi-classifier intrusion detection model based on adaptive weighted voting for detecting the intrusion in parallel.

10 Claims, 1 Drawing Sheet

(51) Int. Cl.
*G06N 3/045* (2023.01)
*G06N 20/00* (2019.01)

(56) References Cited

U.S. PATENT DOCUMENTS

| | | | |
|---|---|---|---|
| 11,893,111 B2* | 2/2024 | Kruthiveti Subrahmanyeswara Sai | G06F 21/554 |
| 2016/0163035 A1* | 6/2016 | Chang | G06N 3/084 382/149 |
| 2017/0132497 A1* | 5/2017 | Santos | G06N 3/042 |
| 2020/0045063 A1* | 2/2020 | Zhang | G06N 20/10 |
| 2020/0082165 A1* | 3/2020 | Wang | G06V 10/454 |
| 2020/0231466 A1* | 7/2020 | Lu | G01N 33/18 |
| 2020/0320382 A1* | 10/2020 | Burkhart | G06N 3/047 |

FOREIGN PATENT DOCUMENTS

| | | |
|---|---|---|
| CN | 107895171 | 4/2018 |
| CN | 108234500 | 6/2018 |
| CN | 111860638 | 10/2020 |

OTHER PUBLICATIONS

Md. Yasir Arafat et al, Cluster-based Under-sampling with Random Forest for Multi-Class Imbalanced Classification, IEEE (Year: 2017).*

Biao, Y. et al., "Weighted random forest algorithm," Software and Algorithms, vol. 35, No. 3, 2016, pp. 28-30 (with English abstract; Cited in PCT International Search Report).

Yang, W. et al., "Intrusion detection algorithm based on depth sequence weighted kernel extreme learning," Application Research of Computers, vol. 37, No. 3, Mar. 2020, pp. 829-832 (with English abstract; Cited in PCT International Search Report).

* cited by examiner

```
                        ┌─── start ───┐
                        └──────┬──────┘
                               ▼
┌─────────────────────────────────────────────────────────────────────┐
│ an unbalanced data set is obtained; the unbalanced data set is under-sampled using the │
│ Neighborhood Cleaning Rule (NCL) algorithm, and the under-sampled unbalanced data      │
│ set is clustered using the Gravity-based Clustering Approach (GCA) algorithm to obtain │
│                    the clustered unbalanced data set                                    │
└─────────────────────────────────────────────────────────────────────┘
                               ▼
┌─────────────────────────────────────────────────────────────────────┐
│ the clustered unbalanced data is input into a trained Deep Belief Network (DBN) model to │
│   extract feature; then the extracted feature is input into multiple DBN-WKELM base    │
│   classifiers in a trained DBN-Weighted Kernel Extreme Learning Machine (WKELM)        │
│ multiclass classifier model to obtain multiple initial classification results; a weight of each │
│  DBN-WKELM base classifier is calculated by the self-adaptive weighted voting method;  │
│  and a final classification result and an intrusion behavioral type corresponding to the final │
│   classification result are obtained according to multiple weights and initial classification │
│                                      results                                            │
└─────────────────────────────────────────────────────────────────────┘
                               ▼
┌─────────────────────────────────────────────────────────────────────┐
│                                  end                                 │
└─────────────────────────────────────────────────────────────────────┘
```

METHOD AND SYSTEM FOR DETECTING INTRUSION IN PARALLEL BASED ON UNBALANCED DATA DEEP BELIEF NETWORK

CROSS REFERENCE TO RELATED APPLICATION

The present application is a national stage of International Application No. PCT/CN2021/094023, filed May 17, 2021, and claims the priority to Chinese Patent Application No. 202010689950.5, filed Jul. 17, 2020, and which are incorporated herein by reference in their entireties.

TECHNICAL FIELD

The present disclosure relates to a field of intrusion detection, and particularly to a method and a system for detecting an intrusion in parallel based on an unbalanced data Deep Belief Network.

BACKGROUND

With the development of society, network security issue has attracted more and more attention. A method for detecting an intrusion is an active-defense method which is effective and addressing the network security problem. Compared with the firewall, the method for detecting the intrusion is more secure. It not only requires fewer resources, which does not affect the normal operation of the system basically, and can be dynamically adjusted.

The current mainstream methods for detecting the intrusion mainly includes: 1. a method for detecting the intrusion based on the unbalanced data, which is mainly used for an unbalanced data set. A technical problem that the detection rate of the minority type is lower than the majority type is solved by data or algorithm optimization. The data optimization is based on a data level. Data balance is achieved by an under-sampling method for reducing samples of the majority type and an over-sampling method for increasing minority type. The algorithm optimization is based on an algorithm level. The minority is assigned greater weights in the classification, so that the error cost of the classifier increases when the minority type is incorrectly classified into the majority type, thereby increasing the detection accuracy for the minority type; 2. A method for detecting the intrusion based on the Deep Belief Network. This method first uses a multi-layer Restricted Boltzmann Machine in the Deep Belief Network to complete feature extraction for the data, and the complex and difficult high-dimension data is dimensionality reduced. Then a back propagation neural network model in the Deep Belief Network model is used to complete the data attack classification; 3. a method for detecting the intrusion based on the Extreme Learning Machine, which uses the Extreme Learning Machine model to complete classification. Compared with the back propagation neural network model, the Extreme Learning Machine model has a simple structure and eliminates the need for repeated iterations in the training, which has advantages of fast operation speed and good generalization performance.

However, the existing method for detecting the intrusion above have some non-ignorable defects: first, for the method for detecting the intrusion based the unbalanced data, the mainstream intrusion detection method for the unbalanced data often use only one of data and algorithm optimization methods, which cannot effectively solve the technical problem of data unbalance; second, for the method for detecting the intrusion based on the dimensionality reduction of the Deep Belief Network, the classification performance of the Deep Belief Network model is closely related to the initial parameters. Generally speaking, the initial parameters of the Deep Belief Network model are specified manually and have a certain degree of randomness. If the parameters are not selected properly, the classification accuracy of the Deep Belief Network model would decrease, and it is easily trapped into local optima. Therefore, the initial parameters can be optimized by intelligent optimization algorithm, but the existing optimization algorithms often use serialized standard operations, which involve a large amount of iterative operations, so that a lot of computing resources and time are consumed to process, and there are problems such as excessive time-consuming and low iteration efficiency when processing the large amount of data; third, for the method for detecting the intrusion based on the Extreme Learning Machine, it only uses a single classifier for classification, and the single classifier has a certain bias in the classification, which has the problems such as low classification accuracy.

SUMMARY

In view of the above-mentioned shortcomings or improvement needs of the prior art, the present disclosure provides a method and a system for detecting an intrusion in parallel based on an unbalanced data Deep Belief Network, the purpose of which is to solve the technical problem that the existing method for detecting the intrusion lacks pertinence to the unbalanced data set, and improve the speed of parameters optimization for the Deep Belief Network model. Finally, the method of the present disclosure can effectively improve the detection accuracy and speed for the intrusion detection.

In order to make the purpose, a method for detecting an intrusion in parallel based on an unbalanced data Deep Belief Network is provided according to an aspect of the present disclosure, including the following steps:

(1) an unbalanced data set is obtained; the unbalanced data set is under-sampled using the Neighborhood Cleaning Rule (NCL) algorithm, and the under-sampled unbalanced data set is clustered using the Gravity-based Clustering Approach (GCA) algorithm to obtain the clustered unbalanced data set; and (2) the clustered unbalanced data obtained in step (1) is input into a trained Deep Belief Network (DBN) model to extract a feature; then the extracted feature is input into multiple DBN-WKELM base classifiers in a trained DBN-Weighted Kernel Extreme Learning Machine (WKELM) multiclass classifier model to obtain multiple initial classification results; a weight of each DBN-WKELM base classifier is calculated by the self-adaptive weighted voting method; and a final classification result and an intrusion behavioral type corresponding to the final classification result are obtained according to multiple weights and initial classification results.

Preferably, step (1) specifically includes the following sub-steps:

(1-1) an unbalanced data set DS is obtained;

(1-2) a sample point x and nearest neighbor data $D_k$ of the sample point x are obtained from the unbalanced data set DS obtained in step (1-1);

(1-3) a set $N_k$ formed by all samples which have different type with the sample point x in the k-nearest neighbor data $D_k$ obtained in step (1-2) and a sample number mum of the set $N_k$ are obtained;

(1-4) whether the sample number num obtained in step (1-3) is greater than or equal to k−1 is determined; if yes, proceeding to step (1-5); otherwise, proceeding to step (1-6);

(1-5) whether the type of the sample point x is a majority sample is determined; if yes, the unbalanced data set DS is updated to DS=DS−x, then proceeding to step (1-6); otherwise the unbalanced data set DS is updated to DS=DS−$N_k$, then proceeding to step (1-6);

(1-6) the above steps (1-2) to (1-5) are repeated for the remaining sample points in the unbalanced data set DS until all the sample points in the unbalanced data set DS has been processed, thereby obtaining the updated unbalanced data set DS;

(1-7) a counter i=1 is set;

(1-8) whether i is equal to a total number of the sample points in the unbalanced data set DS is determined; if yes, proceeding to step (1-14); otherwise, proceeding to step (1-9);

(1-9) the i-th new sample point $d_i=(d_1^i, d_2^i, \ldots, d_n^i)$ is read from the unbalanced data set DS updated in step (1-6), where $d_{e2}^i$ represents the e2-th feature attribute value in the i-th sample; whether a cluster set S of preferred setting is empty id determined; if yes, proceeding to step (1-10); otherwise, proceeding to step (1-11), where e2∈[1, n];

(1-10) a sample point $d_i$ is initialized as a new cluster $C_{new}=\{d_i\}$, a centroid μ is set to $d_i$, the $C_{new}$ is added into the cluster set S' and proceeding to step (1-13);

(1-11) a gravitation for $d_i$ of each cluster in the cluster set S is calculated to obtain a gravitation set G={$g_1$, $g_2$, ..., $g_{ng}$}, and a maximum gravitation a and its corresponding cluster $C_{max}$ is obtained from the gravitation set G, where $n_g$ represents a total number of the clusters in the cluster set S;

(1-12) whether the maximum gravitation $g_{max}$ is less than a determined threshold r is determined; if yes, step (1-10) is returned to; otherwise the sample point $d_i$ is merged into the cluster $C_{max}$ and a centroid $μ_{max}$ of the cluster $C_{max}$ which has merged the sample point $d_i$ is updated, then proceeding to step (1-13);

(1-13) the counter is set to 1=i+1, and step (1-8) is returned to; and (1-14) all the clusters in the cluster set S is traversed, and whether the types of all the sample points in each cluster is a majority sample is determined; if yes, the majority samples in the cluster are randomly saved according to a sampling rate sr, then the traversing process is repeated for the remaining clusters; otherwise the traversing process is repeated for the remaining clusters.

Preferably, the gravitation g between the sample points $d_i$ and the clusters C is calculated according to the following formula:

$$g = \frac{\ln(\ln(C_{num}+1)) \cdot \ln(\ln 2)}{\left(\frac{1}{n}\sum_{e2=1}^{n}|d_{e2}^i - μ_{e2}|\right)^2}$$

where $C_{num}$ is a number of the sample points in the cluster C, $μ_{e2}$ represents the e2-th feature attribute value in the centroid μ of the cluster C;

a formula for updating a centroid $μ_{max}$ of a cluster $C_{max}$ is as follows:

$$μ_{max} = \frac{1}{C_{maxn}}\sum_{p=1}^{C_{maxn}} d_p$$

where $C_{maxn}$ is a number of the sample points in the cluster $C_{max}$ which has merged the sample point $d_i$, $d_p$ is the p-th sample point in the cluster $C_{max}$ which has merged the sample point $d_i$, and p∈[1, $C_{max}$].

Preferably, the DBN model is trained by the steps:

(2-1) a Deep Belief Network (DBN) model is obtained, and the DBN model is optimized in a distributed memory computing platform using the improved differential evolution algorithm to obtain an optimized DBN model; and (2-2) the DBN model optimized in step (2-1) is trained to obtain a trained DBN model.

Preferably, step (2-1) specifically includes the following sub-steps:

(2-1-1) a DEN model $W_{dbn}=\{W_1, W_2, \ldots, W_{dep}\}$, is obtained, where cep represents a total number of hidden layers in the DBN model, $W_{dh}$ as represents a neuron number of the di-th hidden layer in the DBN model, and di∈[1, 3];

(2-1-2) an initial population with a population scale of $n_{ps}$ structural vectors is randomly generated; one of the structural vectors is randomly selected from the initial population and used as the global optimal solution $x_{best}$ of the initial population; and the initial population is written into the Hadoop Distributed File System (HDFS) in the form of files, and a Counter cnt=1 is set;

(2-1-3) whether cnt is equal to a maximum iteration number T or the global optimal solution $x_{best}$ is converged is determined; if yes, the global optimal solution is output, and the process is completed; otherwise, proceeding to step (2-4);

(2-1-4) whether cnt is 1 is determined; if yes, the file written in the HDFS in step (2-1-2) is read from the HDFS and divided into $n_{pa}$ input slices, and each input slice includes a sub-population; then proceeding to step (2-1-5); otherwise the updated file is read from the HDFS and divided into $n_{pa}$ input slices, and each input slice includes a sub-population; then proceeding to step (2-1-5);

(2-1-5) for each sub-population obtained in step (2-1-4), the j-th individual $x_{cnt}^j=\{W_{cnt,j}^1, W_{cnt,j}^2, \ldots, W_{cnt,j}^{dep}\}$ of the cnt-th generation in the sub-population is obtained and used as the neuron number in the DBN model; a classification result of $n_i$ classification points is obtained according to the corresponding DBN model; a classification error CE of the DBN model is calculated according to the classification result and used as an adaptability value $f(x_{cnt}^j)$ of the j-th individual of the cnt-th generation in the sub-population, where j∈[1, the total number of the individual of the cut-th generation in the sub-population], and $W_{cnt,j}^{dep}$ represents the dep-th element of the j-th individual of the cnt-th generation in the sub-population;

(2-1-6) for each sub-population obtained in step (2-1-4), an adaptability value set $F=\{f(x_{cnt}^1), f(x_{cnt}^2), \ldots, f(x_{cnt}^{sn})\}$ consisted of the adaptability value for all individuals of the cnt-th generation in the sub-population is obtained, where sn is a total number of the adaptability value in the adaptability value set F; all the adaptability value in the adaptability value set is sorted in ascending order to obtain a new adaptability value set $\hat{F}=\{\hat{f}(x_{cnt}^1), \hat{f}(x_{cnt}^2), \ldots, \hat{f}(x_{cnt}^{sn})\}$; an individual corresponding to the minimum adaptability value in the new adaptability value set $\hat{F}$ is used as the optimal solution for the sub-population, and the minimum adaptability value is used as the best adaptability value for the sub-population;

(2-1-7) the minimum value is selected from the best adaptability value of all the sub-populations and used as the overall best adaptability value, and the global optimal solution $x_{best}$ is updated to an individual corresponding to the overall best adaptability value;

(2-1-8) for the adaptability set F obtained in step (2-1-6), two individuals $x_{cnt}^1$ and $x_{cnt}^2$ with the minimum adaptability value are obtained to form a set $E_{cnt}=\{x_{cnt}^1, x_{cnt}^2\}$, and the remaining individuals in the adaptability set F forms a set $I_{cnt}=\{x_{cnt}^3, \ldots, x_{cnt}^{sn}\}$;

(2-1-9) a self-adaptive mutated individual $w_{cnt}^j$ is generated according to the $\vec{j}$-th target individual $x_{cnt}^j$ in the set $I_{cnt}$ obtained in step (2-1-8), where $\vec{j} \in [3, sn]$;

(2-1-10) a crossover operation is performed on the self-adaptive mutated individual $\vec{w_{cnt}^j}$ obtained in step (2-1-9) and the $\vec{j}$-th target individual $\vec{x_{cnt}^j}$ in the set $I_{cnt}$ obtained in step (2-1-8) to generate experimental individual $u_{cnt}^j=\{u_{cnt,j}^1, u_{cnt,j}^2, \ldots, u_{cnt,j}^D\}$;

(2-1-11) an adaptability value $f(\vec{x_{cnt}^j})$ corresponding to the experimental individual $\vec{w_{cnt}^j}$ obtained in step (2-1-10) and an adaptability value $f(\vec{u_{cnt}^j})$ corresponding to the target individual $\vec{x_{cnt}^j}$ obtained in step (2-1-9) are obtained; a smaller adaptability value is used to replace the corresponding individual in the set $I_{cnt}$, and the individual of the set $E_{cnt}$ obtained in step (2-8) is added to $I_{cnt}$, thereby obtaining a updated set $I_{cnt}$;

(2-1-1²) the counter is set to cnt=cnt+1; the updated set $I_{cnt}$ is saved on the HDFS and step (2-1-3) is returned to.

Preferably, the classification error is obtained by a formula as follows:

$$CE = \frac{1}{n_t}\sum_{i_t=1}^{n_t} |Y_{i_t} - \hat{Y}_{i_t}|$$

where $Y_{i_t}$ is a real result, $\hat{Y}_{i_t}$ is a classification result, $n_t$ is a number of the classification points;

a formula for generating the self-adaptive mutated individual is as follows:

$$w_{cnt}^j = \vec{x_{cnt}^{j_1}} + F_c(\vec{x_{cnt}^{j_2}} - \vec{x_{cnt}^{j_3}})$$

where $\vec{j_1}, \vec{j_2},$ and $\vec{j_3}: \in [3, sn]$, these three are different from each other and not equal to $\vec{j}$, and $F_c$ is a self-adaptive mutation factor;

a formula for calculating the self-adaptive mutation factor $F_c$ is as follows:

$$F_c = f\cos\left(\frac{\pi}{2} \times \frac{2(T-cnt)}{T}\right)$$

where f is an initial mutation factor;
a formula for generating the experimental individual is as follows:

$$u_{cnt,j}^h = \begin{cases} w_{cnt,j}^h & rand \leq CR \text{ or } h = randn \\ x_{cnt,j}^h & rand > CR \text{ or } h \neq randn \end{cases}$$

where randn is a random integer generated randomly from $\{1, 2, \ldots, D\}$, rand is a uniformly distributed random real number within [0, 1], CR is a crossover factor, and D is an individual genetic dimension; $h \in [1, D]$.

Preferably, step (2-2) specifically includes the following sub-steps:

(2-2-1) the unbalanced data set clustered in step (1) is divided into a training set and a test set according to a ratio of 6:4;

(2-2-2) a counter cnt2=1 is set;

(2-2-3) an initial state of an input layer of the DBN model optimized in step (2) is set as a training sample of the training set according to the training set obtained in step (2-2-1); the input layer and the first hidden layer of the DBN model are constructed as the Restricted Boltzmann Machine (RBM) network, and a weight W, an offset a of the input layer, and an offset b of the first hidden layer between the input layer and the first hidden layer of the RBM network are initialized;

(2-2-4) whether cnt2 is equal to 3 is determined: if yes, the process is completed; otherwise, proceeding to step (2-2-5);

(2-2-5) the input value of the RBM network, the weight W, the offset a of the input layer, and the offset b of the cnt2-th hidden layer between the input layer and the cnt2-th hidden layer of the RBM network are updated using the Contrastive Divergence (CD) algorithm;

(2-2-6) the iterative training is performed on the RBM network updated in step (2-2-6) until a reconstruction error of the RBM network reaches the minimum, so that an RBM model after overall iterative training is obtained. the (cnt2+1)-th hidden layer of the DBM model optimized in step (2) is added into the RBM network after overall iterative training to construct a new RBM network; at the same time, the weight W between the input layer and the (cnt2+1)-th hidden layer of the new DBM network is updated to a weight output by the RBM network after overall iterative training. The offset a of the input layer and the offset b of the (cnt2+1)-th hidden layer are respectively updated to an offset output by the RBM network after overall iterative training, and an output value of the RBM network after overall iterative training is used as an input value for the new RBM network;

(2-2-7) the counter is set to cnt2=cnt2+1, and step (2-2-4) is returned to.

Preferably, the DBN-WKELM multiclass classifier model is trained by the following process: a trained DBN model is obtained; four sub-threads are started, and an output value of the trained DBN model is set to an input value $X_{in}$ of the WKELM hidden layer in each sub-thread; a cost-sensitive matrix $W_{cs}$ is obtained by weighting the input value $X_{in}$; and an output weight β of the WKELM hidden layer is obtained according to the cost-sensitive matrix $W_{cs}$, and the DBN-WKELM base classifier which is based on feature extraction of the DBN is obtained based on the output weight β; the trained DBN-WKELM multiclass classifier model is consisted of the four DBN feature extraction based DBN-WKELM base classifiers.

Preferably, a formula for the output weight β of the WKELM hidden layer is:

$$\beta = \left(\frac{1}{C_r} W_{cs}^{-1} + \Omega\right)^{-1} T_l$$

where $C_r$ is a regularization coefficient, Ω is a kernel matrix corresponding to a kernel function $F_k$ of the WKELM base classifier, and $T_l$ is a data label corresponding to the input value $X_{in}$;

a formula for calculating a weight of a self-adaptive weighted voting method is as follows:

$$W_q = \frac{x_{ac}^q - x_{fp}^q}{\sum_{q=1}^{m}\left(x_{ac}^q - x_{fp}^q\right)}$$

where $W_q$ is a voting weight of the q-th DBN-WKELM base classifier in the DBN-WKELM multiclass classifier model, $x_{ac}^q$ is a classification accuracy of the q-th DBN-WKELM base classifier, $x_{fp}^q$ is a classification false-positive rate of the q-th DBN-WKELM base classifier, and q∈[1, m];

a formula for calculating the classification accuracy and false-positive rate of the q-th DBN-WKELM base classifier is as follows:

$$x_{ac}^q = \frac{n_c^q}{N_s^q}, x_{fp}^q = \frac{n_f^q}{N_c^q}$$

where $n_c^q$ is a number of the samples classified correctly in the q-th DBN-WKELM base classifier, $N_s^q$ is a total number of samples in the q-th DBN-WKELM base classifier, $n_f^q$ is a number of normal samples mistaken regarded as intrusion in the q-th DBN-WKELM base classifier, and $N_c^q$ is a total number of normal samples in the q-th DBN-WKELM base classifier.

A system for detecting an intrusion in parallel based on an unbalanced data Deep Belief Network is provided according to another aspect of the present disclosure, including:

a first module, configured to obtain an unbalanced data set, under-sample the unbalanced data set using the Neighborhood Cleaning Rule algorithm, and cluster the under-sampled unbalanced data set using the Gravity-based Clustering Approach algorithm to obtain the clustered unbalanced data set; and a second module, configured to input the clustered unbalanced data obtained in the first module into a trained Deep Belief Network model to extract a feature, input the extracted feature into multiple DBN-WKELM base classifiers in a trained DBN-WKELM multiclass classifier model to obtain multiple initial classification results, calculate a weight of each DBN-WKELM base classifier by the self-adaptive weighted voting method, and obtain a final classification result and an intrusion behavioral type corresponding to the final classification result according to multiple weights and initial classification results.

In summary, compared with the prior art, the above technical solution conceived by the present disclosure can achieve the following beneficial effects:

(1) steps (1-1) to (1-14) are used in the present disclosure, which uses the improved under-sampling algorithm for the unbalanced data set to reduce the ratio of the majority type; and the Weighted Kernel Extreme Learning Machine is used in the present disclosure to weight each training sample, which reduces the weight of the majority type and increases the weight of the minority type, thereby improving the detection accuracy of the minority type. Therefore, the technical problem that the data unbalance cannot be solved effectively by the existing method for detecting intrusion based on the unbalanced data can be solved effectively;

(2) steps (2-1-1) to (2-1-12) are used in the present disclosure, which uses the parallel improved differential evolution algorithm to optimize the Deep Belief Network model parameters, thereby optimizing the iteration process of the algorithm, improving the iteration efficiency, and reducing the time consumed for the algorithm. Therefore, the technical problems that the model parameters need to consume a large amount of computing resource and time to process and that such as long time-consuming and low iteration efficiency when processing a large amount of data in the existing method for detecting the intrusion based on the dimensionality reduction of the Deep Belief Network can be solved.

(3) the DBN-WKELM multiclass classifier consisted of multiple DBN-WKELM base classifiers with different structure is used in the present disclosure; each base classifier is executed in parallel, which promotes the speed of the intrusion detection; and the multiclass classifier uses self-adaptive weighted voting algorithm to promote the classification accuracy of the intrusion detection by increasing the voting weight of the base classifier with high classification accuracy and low classification false-positive rate. Therefore, the technical problem that only a single classifier is used for classification and the bias and low classification accuracy existed in the single classifier classification in the existing method for detecting intrusion based on the classification of the Extreme Learning Machine can be solved.

BRIEF DESCRIPTION OF THE DRAWINGS

FIG. 1 is a flow diagram of a method for detecting an intrusion in parallel based on an unbalanced data Deep Belief Network according to the present disclosure.

DETAILED DESCRIPTION

In order to make the purpose, technical solution and advantages of the present disclosure clearer, the present disclosure will be described in further detail in conjunction with the accompanying drawings and embodiments. It should be understood that the specific embodiments described herein are only used for explaining the present disclosure, rather than limiting the present disclosure. In addition, the technical feature involved in the various embodiments of the present disclosure described below can be combined with each other as long as no contradiction between occurs.

As shown in FIG. 1, a method for detecting an intrusion in parallel based on an unbalanced data Deep Belief Network provided by the present disclosure includes the following steps:

(1) an unbalanced data set is obtained: the unbalanced data set is under-sampled using the Neighborhood Cleaning Rule (NCL) algorithm, and the under-sampled unbalanced data set is clustered using the Gravity-based Clustering Approach (GCA) algorithm to obtain the clustered unbalanced data set.

In the present embodiment, the unbalanced data set is the KDDCUJP99 intrucsion detection data set.

The present step specifically includes the following substeps:

(1-1) an unbalanced data set DS is obtained;

(1-2) a sample point x and nearest neighbor data De of the sample point x are obtained from the unbalanced data set DS obtained in step (1-1).

Specifically, the nearest neighbor parameter k ranges from 5 to 10, preferably 7.

Typically, the Euclidean distance is used to determine whether that two samples are k-nearest neighbor. Assuming that a sample point $x_{k1}=(x_1^{k1}, x_2^{k1}, \ldots, x_n^{k1})$, $x_{k2}=(x_1^{k2}, x_2^{k2}, \ldots, x_n^{k2})$, belongs to n-dimensional space $R^n$, where n is an arbitrary natural number, k1 and k2∈[1, a total number of the sample points in the unbalanced data set], $x_{e1}^{k1}$ represents the e1-th feature attribute value in the k1-th sample point, e1∈[1, a total number of the feature attributes in the k1-th sample point]. Then the Euclidean distance between the sample points $x_{k1}$ and $x_{k2}$ is defined as:

$$d(x_{k1},x_{k2})=\sqrt{\Sigma_{n1=1}^{n}(x_{e1}^{k1}-x_{e1}^{k2})^2}.$$

(1-3) a set $N_k$ formed by all samples which have different type with the sample point x in the k-nearest neighbor data $D_k$ obtained in step (1-2) and a sample number num of the set $N_k$ are obtained.

Specifically, the sample point type includes a majority sample and a minority sample. For the KDDCUP99 intrusion detection data set, the majority sample refers to Normal, Detect and Probe, and Denial of service (Dos) behavioral. The minority sample refers to User to Root (U2R) and Remote to Local (R2L) behavioral. The behavioral other than the normal behavioral are considered intrusion behavioral type.

(1-4) whether the sample number num obtained in step (1-3) is greater than or equal to k−1 is determined; if yes, proceeding to step (1-5); otherwise, proceeding to step (1-6).

(1-5) whether the type of the sample point x is a majority sample is determined; if yes, the unbalanced data set DS is updated to DS=DS−x, then proceeding to step (1-6); otherwise the unbalanced data set DS is updated to DS=DS−$N_k$, then proceeding to step (1-6).

(1-6) the above steps (1-2) to (1-5) are repeated for the remaining sample points in the unbalanced data set DS until all the sample points in the unbalanced data set DS has been processed, thereby obtaining the updated unbalanced data set DS.

(1-7) a counter i=1 is set.

(1-8) whether i is equal to a total number of the sample points in the unbalanced data set DS is determined; if yes, proceeding to step (1-14); otherwise, proceeding to step (1-9).

(1-9) the i-th new sample point $d_i=(d_1^i, d_2^i, \ldots, d_n^i)$ is read from the unbalanced data set DS updated in step (1-6), where $d_{e2}^i$ represents the e2-th feature attribute value in the i-th sample; whether a cluster set S of preferred setting is empty id determined; if yes, proceeding to step (1-10); otherwise, proceeding to step (1-11), where e2∈[1, n].

(1-10) a sample point $d_i$ is initialized as a new cluster $C_{new}=\{d_i\}$, a centroid μ is set to $d_i$, the $C_{new}$ is added into the cluster set S, and proceeding to step (1-13).

(1-11) a gravitation for $d_i$ of each cluster in the cluster set S is calculated to obtain a gravitation set G=$\{g_1, g_2, \ldots, g_{ng}\}$, and a maximum gravitation $g_{max}$ and its corresponding cluster $C_{max}$ is obtained from the gravitation set G, where $n_g$ represents a total number of the clusters in the cluster set S.

The gravitation g between the sample points d and the clusters C is calculated according to the following formula:

$$g = \frac{\ln(\ln(C_{num}+1)) \cdot \ln(\ln 2)}{\left(\frac{1}{n}\sum_{e2=1}^{n}|d_{e2}^i - \mu_{e2}|\right)^2}$$

where $C_{num}$ is a number of the sample points in the cluster C, $\mu_{e2}$ represents the e2-th feature attribute value in the centroid μ of the cluster C.

(1-12) whether the maximum gravitation $g_{max}$ is less than a determined threshold r is determined; if yes, step (1-10) is returned to; otherwise the sample point $d_i$ is merged into the cluster $C_{max}$, and a centroid $\mu_{max}$ of the cluster $C_{max}$ which has merged the sample point $d_i$ is updated, then proceeding to step (1-13).

A formula for updating a centroid $\mu_{max}$ of a cluster $C_{max}$ is as follows:

$$\mu_{max} = \frac{1}{C_{maxn}}\sum_{p=1}^{C_{maxn}} d_p$$

where $C_{maxn}$ is a number of the sample points in the cluster $C_{max}$ which has merged the sample point $d_i$, $d_p$ is the p-th sample point in the cluster $C_{max}$ which has merged the sample point $d_i$, and p∈[1, $C_{maxn}$].

Specifically, for the KDDCUP99 intrusion detection data set, the threshold r ranges from 95 to 143, preferably 100.

(1-13) the counter is set to i=i+1, and step (1-8) is returned to.

(1-14) all the clusters in the cluster set S is traversed, and whether the types of all the sample points in each cluster is a majority sample is determined; if yes, the majority samples in the cluster are randomly saved according to a sampling rate sr, then the traversing process is repeated for the remaining clusters; otherwise the traversing process is repeated for the remaining clusters.

Specifically, the sampling rate sr ranges from 0.6 to 0.9.

(2) the clustered unbalanced data obtained in step (1) is input into a trained Deep Belief Network (DBN) model to extract a feature; then the extracted feature is input into multiple DBN-WKELM base classifiers in a trained DBN-Weighted Kernel Extreme Learning Machine (WKELM) multiclass classifier model to obtain multiple initial classification results; a weight of each DBN-WKELM base classifier is calculated by the self-adaptive weighted voting method; and a final classification result and an intrusion behavioral type corresponding to the final classification result are obtained according to multiple weights and initial classification results.

Specifically, the DBN model of the present step is trained by the steps:

(2-1) a Deep Belief Network (DBN) model is obtained, and the DBN model is optimized in a distributed memory computing platform using the improved differential evolution algorithm to obtain an optimized DBN model.

In the present embodiment the distributed memory computing platform is the Apache Spark platform.

The present step specifically includes the following substeps:

(2-1-1) a DBN model $W_{dbn}=\{W_1, W_2, \ldots, W_{dep}\}$, is obtained, where dep represents a total number of hidden layers in the DBN model, $W_{di}$ represents a neuron number of the di-th hidden layer in the DBN model, and di∈[1, 3].

Specifically, the total number of the hidden layers in the DBN model equals to 3; the maximum neuron number $x_{max}$ in each hidden layer ranges from 500 to 1500, preferably 1000; the minimum neuron number $x_{min}$ in the hidden layer ranges from 1 to 5, preferably 1.

(2-1-2) an initial population with a population scale of $n_{ps}$ structural vectors is randomly generated; one of the structural vectors is randomly selected from the initial population and used as the global optimal solution $x_{best}$ of the initial population; and the initial population is written into the Hadoop Distributed File System (HDFS) in the form of files, and a counter cnt=1 is set.

Specifically, the population scale ranges from 1000 to 2000, preferably 1000.

(2-1-3) whether cnt is equal to a maximum iteration number T or the global optimal solution $x_{best}$ is converged is determined; if yes, the global optimal solution is output, and the process is completed; otherwise, proceeding to step (2-4).

Specifically, the maximum iteration number T ranges from 500 to 1000, preferably 500.

(2-1-4) whether cnt is 1 is determined; if yes, the file written in the HDFS in step (2-1-2) is read from the HDFS and divided into $n_{pa}$ input slices, and each input slice includes a sub-population; then proceeding to step (2-1-5); otherwise the updated file is read from the HDFS and divided into $n_{pa}$ input slices, and each input slice includes a sub-population; then proceeding to step (2-1-5).

Specifically, dividing the file into $n_{pa}$ input slices is implemented through a Map phase on the Spark platform. The number $n_{pa}$ of input slices ranges from 2 to 10, preferably 5.

(2-1-5) for each sub-population obtained in step (2-1-4), the j-th individual $x_{cnt}^j=\{W_{cnt,j}^1, W_{cnt,j}^2, \ldots, W_{cnt,j}^{dep}\}$ of the cnt-th generation in the sub-population is obtained and used as the neuron number in the DBN model: a classification result of $n_i$ classification points is obtained according to the corresponding DBN model; a classification error CE of the DBN model is calculated according to the classification result and used as an adaptability value $f(x_{cnt}^j)$ of the j-th individual of the cnt-th generation in the sub-population, where j∈[1, the total number of the individual of the cnt-th generation in the sub-population], and $W_{cnt,j}^{dep}$ represents the dep-th element of the j-th individual of the cnt-th generation in the sub-population.

Specifically, the classification error of the present step is obtained by a formula as follows:

$$CE = \frac{1}{n_t}\sum_{i_t=1}^{n_t}|Y_{i_t} - Y'_{i_t}|$$

where $Y_{i_t}$ is a real result, $\hat{Y}_{i_t}$ is a classification result, $n_t$ is a number of the classification points.

Specifically, the number of the classification points ranges from 30 to 100, preferably 50.

(2-1-6) for each sub-population obtained in step (2-1-4), an adaptability value set $F=\{f(x_{cnt}^1), f(x_{cnt}^2), \ldots, f(x_{cnt}^{sn})\}$ consisted of the adaptability value for all individuals of the cnt-th generation in the sub-population is obtained, where si is a total number of the adaptability value in the adaptability value set F; all the adaptability value in the adaptability value set is sorted in ascending order to obtain a new adaptability value set $\hat{F}=\{\hat{f}(x_{cnt}^1), \hat{f}(x_{cnt}^2), \ldots, \hat{f}(x_{cnt}^{sn})\}$; an individual corresponding to the minimum adaptability value in the new adaptability value set $\hat{F}$ is used as the optimal solution for the sub-population, and the minimum adaptability value is used as the best adaptability value for the sub-population.

(2-1-7) the minimum value is selected from the best adaptability value of all the sub-populations and used as the overall best adaptability value, and the global optimal solution $x_{best}$ is updated to an individual corresponding to the overall best adaptability value.

(2-1-8) for the adaptability set F obtained in step (2-1-6), two individuals $x_{cnt}^1$ and $x_{cnt}^2$ with the minimum adaptability value are obtained to form a set $E_{cnt}=\{x_{cnt}^1, x_{cnt}^2\}$, and the remaining individuals in the adaptability set F forms a set $I_{cnt}=\{x_{cnt}^3, \ldots, x_{cnt}^{sn}\}$.

(2-1-9) a self-adaptive mutated individual $\vec{w}_{cnt}^j$ is generated according to the $\vec{j}$-th target individual $\vec{x}_{cnt}^j$ in the set $I_{cnt}$ obtained in step (2-1-8), where $\vec{j} \in [3, sn]$.

Specifically, a formula for generating the self-adaptive mutated individual is as follows:

$$\vec{w}_{cnt}^j = \vec{x}_{cnt}^{j_1} + F_c(\vec{x}_{cnt}^{j_2} - \vec{x}_{cnt}^{j_3})$$

where $\vec{j}_1, \vec{j}_2,$ and $\vec{j}_3 \in [3, sn]$, these three are different from each other and not equal to $\vec{j}$, and $F_c$ is a self-adaptive mutation factor.

A formula for calculating the self-adaptive mutation factor $F_c$ is as follows:

$$F_c = f\cos\left(\frac{\pi}{2} \times \frac{2(T-cnt)}{T}\right)$$

where f is an initial mutation factor which ranges from 0.5 to 0.8, preferably 0.6.

(2-1-10) a crossover operation is performed on the self-adaptive mutated individual $\vec{w}_{cnt}^j$ obtained in step (2-1-9) and the j-th target individual in the set $I_{cnt}$ obtained in step (2-1-8) to generate experimental individual $\vec{u}_{cnt}^j = \{u_{cnt,\vec{j}}^1, u_{cnt,\vec{j}}^2, \ldots, u_{cnt,\vec{j}}^D\}$.

Specifically, a formula for generating the experimental individual is as follows:

$$u^h_{cnt,j} = \begin{cases} w^h_{cnt,j}, & rand \le CR \text{ or } h = randn \\ x^h_{cnt,j}, & rand > CR \text{ or } h \ne randn \end{cases}$$

where randn is a random integer generated randomly from $\{1, 2, \ldots, D\}$, rand is a uniformly distributed random real number within $[0, 1]$, CR is a crossover factor, and D is an individual genetic dimension; $h \in [1, D]$.

Specifically, the crossover factor C R ranges from 0.7 to 0.9, preferably 0.8, and the individual genetic dimension D ranges from 1 to 3, preferably 1.

(2-1-11) an adaptability value $f(\vec{x_{cnt}^j})$ corresponding to the experimental individual $\vec{u_{cnt}^j}$ obtained in step (2-1-10) and an adaptability value $f(\vec{u_{cnt}^j})$ corresponding to the target individual $x_{cnt}^j$ obtained in step (2-1-9) are obtained; a smaller adaptability value is used to replace the corresponding individual in the set $I_{cnt}$, and the individual of the set $E_{cnt}$ obtained in step (2-8) is added to $I_{cnt}$, thereby obtaining a updated set $I_{cnt}$.

(2-1-12) the counter is set to cnt=cnt+1; the updated set $I_{cnt}$ is saved on the HDFS and step (2-1-3) is returned to.

(2-2) the DBN model optimized in step (2-1) is trained to obtain a trained DBN model.

Specifically, the present step specifically includes the following sub-steps:

(2-2-1) the unbalanced data set clustered in step (1) is divided into a training set and a test set according to a ratio of 6:4.

(2-2-2) a counter cnt2=1 is set.

(2-2-3) an initial state of an input layer of the DBN model optimized in step (2) is set as a training sample of the training set according to the training set obtained in step (2-2-1); the input layer and the first hidden layer of the DBN model are constructed as the Restricted Boltzmann Machine (RBM) network, and a weight W, an offset a of the input layer, and an offset b of the first hidden layer between the input layer and the first hidden layer of the RBM network are initialized.

Specifically, W is a random value output by using a normal distribution with a standard deviation of 0.1; a and b are set to 0.

(2-2-4) whether cnt2 is equal to 3 is determined; if yes, the process is completed; otherwise, proceeding to step (2-2-5).

(2-2-5) the input value of the RBM network, the weight W, the offset a of the input layer, and the offset b of the cnt2-th hidden layer between the input layer and the cnt2-th hidden layer of the RBM network are updated using the Contrastive Divergence (CD) algorithm.

(2-2-6) the iterative training is performed on the RBM network updated in step (2-2-6) until a reconstruction error of the RB M network reaches the minimum, so that an RBM model after overall iterative training is obtained. the (cnt2+1)-th hidden layer of the DBM model optimized in step (2) is added into the RBM network after overall iterative training to construct a new RBM network; at the same time, the weight W between the input layer and the (cnt2+1)-th hidden layer of the new DBM network is updated to a weight output by the RBM network after overall iterative training. The offset a of the input layer and the offset b of the (cnt2+1)-th hidden layer are respectively updated to an offset output by the RBM network after overall iterative training, and an output value of the RBM network after overall iterative training is used as an input value for the new RBM network.

The reconstruction error RE of the RBM network is:

$$RE = \Sigma_{i_e=1}^{n_e} |V_{i_e} - V_{i_e}^t|$$

where $n_e$ represents neuron number of the input layer of the RBM network; $V_{i_e}$ represents a training sample value of the $i_e$-th neuron of the input layer of the RBM network before iterative training, and $V_{i_e}^t$ represents a training sample value of the $i_e$-th neuron of the input layer of the RBM network after iterative training.

(2-2-7) the counter is set to cnt2=cnt2+1, and step (2-2-4) is returned to.

The training process for the DBM model can be implemented by the above steps (2-2-1) to (2-7).

The DBN-WKELM multiclass classifier model of the present disclosure is consisted of m DBN-WKELM base classifiers (the value of m is 4 in the present embodiment), and each DBN-WKELM base classifier includes an input layer, an output layer, three DBN hidden layers, and a WKELM hidden layer. A node number of the input layer and output layer is 122 and 5, respectively. A node number of each DBN hidden layer is 110, 70, and 30, respectively. At the same time, a node number of the WKELM hidden layer for the four DBN-WKELM base classifiers is 55, 65, 75, and 85, respectively.

The DBN-WKELM multiclass classifier model of the present disclosure is trained by the following process:

a trained DBN model is obtained; four sub-threads are started, and an output value of the trained DBN model is set to an input value X, of the WKELM hidden layer in each sub-thread; a cost-sensitive matrix $W_{cs}$ is obtained by weighting the input value $X_{in}$; and an output weight β of the WKELM hidden layer is obtained according to the cost-sensitive matrix $W_{cs}$, and the DBN-WKELM base classifier which is based on feature extraction of the DBN is obtained based on the output weight β; the trained DBN-WKELM multiclass classifier model is consisted of the four DBN feature extraction based DBN-WKELM base classifiers.

In the present step, the specific process for obtaining the cost-sensitive matrix $W_{cs}$ by weighting the input value $X_{in}$ is:

a weight $W_{i_x}$ is assigned to the $i_x$-th sample point in $X_{in}$ to obtain the $i_x$-th main diagonal element $we_{i_x}$ in the cost-sensitive matrix $W_{cs}$, where $i_x \in [1, $ a total number of the sample point in $X_{in}]$, $W_{cs}$ is a diagonal matrix, and the weight $W_{i_x}$ is equals to:

$$w_{i_x} = \frac{1}{m_{i_x}}$$

where $m_{i_x}$ is an amount of the type to which the $i_x$-th sample point belongs in the training set.

A formula for the output weight f of the WKELM hidden layer is:

$$\beta = \left(\frac{1}{C_r} W_{cs}^{-1} + \Omega\right)^{-1} T_l$$

where $C_r$ is a regularization coefficient, $\Omega$ is a kernel matrix corresponding to a kernel function $F_k$ (the kernel function can be the polynomial kernel function or Gaussian kernel function in the present disclosure) of the WKELM base classifier, and $T_l$ is a data label corresponding to the input value $X_{in}$.

A formula for calculating a weight of a self-adaptive weighted voting method is as follows:

$$W_q = \frac{x_{ac}^q - x_{fp}^q}{\sum_{q=1}^{m}(x_{ac}^q - x_{fp}^q)}$$

where $W_q$ is a voting weight of the q-th DBN-WKELM base classifier in the DBN-WKELM multiclass classifier model, $x_{ac}^q$ is a classification accuracy of the q-th DBN-WKELM base classifier, $x_{fp}^q$ is a classification false-positive rate of the q-th DBN-WKELM base classifier, and $q \in [1, n]$.

A formula for calculating the classification accuracy and false-positive rate of the q-th DBN-WKELM base classifier is as follows:

$$x_{ac}^q = \frac{n_c^q}{N_s^q}, \quad x_{fp}^q = \frac{n_f^q}{N_c^q}$$

where c is a number of the samples classified correctly in the q-th DBN-WKELM base classifier, $N_s^q$ is a total number of samples in the q-th DBN-WKELM base classifier, $n_f^q$ is a number of normal samples mistaken regarded as intrusion in the q-th DBN-WKELM base classifier, and $N_c^q$ is a total number of normal samples in the q-th DBN-WKELM base classifier.

In step (2), an initial classification result $V=(v_1, v_2, v_3, v_4, v_5)$ of each base classifier is obtained, which corresponds to five behavioral types of Normal, Probe, Dos, U2R, and R2L, respectively. Then the weight of each base classifier is calculated by the self-adaptive weighted voting method. Finally a total classification result $C_{res}=\Sigma_{q=1}^{m}W_q V_q$ of the DBN-WKELM multiclass classifier model is obtained according to the initial classification results V and weight of each base classifier. A behavioral type corresponding to an element in an initial classification result corresponding to the maximum value is selected from the total classification results and this behavioral type is used as the final behavioral type.

A data in the test set is assumed that the initial classification results obtained by the four DBN-WKELM base classifiers are (0, 1, 0, 0, 0), (0, 0, 1, 0, 0), (0, 1, 0, 0, 0), (0, 0, 1, 0, 0) respectively. The classification accuracy of each base classifier is 98.5%, 97.8%, 98.2%, and 97.3%, and the classification false-positive rate is 2.3%, 2.8%, 2.7%, and 2.0%. The weight of each base classifier can be calculated according to the above formula and obtained as 0.252, 0.249, 0.250, and 0.249. Then, $v_1$ (i.e. 0) in the initial classification result obtained by the first DBN-WKELM base classifier*0.252+$v_1$ (i.e. 0) in the initial classification result obtained by the second DBN-WKELM base classifier*0.252+$v_1$ (i.e. 0) in the initial classification result obtained by the third DBN-WKELM base classifier*0.252+$v_1$ (i.e. 0) in the initial classification result obtained by the fourth DBN-WKELM base classifier*0.252=0. Then, $v_2$ (i.e. 1) in the initial classification result obtained by the first DBN-WKELM base classifier*0.252 $v_2$ (i.e. 0) in the initial classification result obtained by the second DBN-WKELM base classifier*0.252+$v_2$ (i.e. 1) in the initial classification result obtained by the third DBN-WKELM base classifier*0.252+$v_2$ (i.e. 0) in the initial classification result obtained by the fourth DBN-WKELM base classifier*0.252=0502 . . . , and so on. Five total classification results (0, 0.502, 0.498, 0, 0) are obtained finally and the maximum value, which is 0,502 in this case, is selected. The behavioral type (i.e. Probe behavioral type) corresponding to the element (i.e. $v_2$) in the initial classification result corresponding to the maximum value is used as the final behavioral type.

Those skilled in the art can easily understand that the above are only preferred embodiments of the present disclosure and are not intended to limit the present disclosure. Any modification, equivalent substitutions or improvements within the spirit and principle of the present disclosure should be included in the protection scope of the present disclosure.

The invention claimed is:

1. A method for detecting an intrusion in parallel based on an unbalanced data Deep Belief Network (DBN), comprising:
   (1) obtaining an unbalanced data set, under-sampling the unbalanced data set using the Neighborhood Cleaning Rule algorithm, and clustering the under-sampled unbalanced data set using the Gravity-based Clustering Approach algorithm to obtain the clustered unbalanced data set; and
   (2) inputting the clustered unbalanced data obtained in step (1) into a trained Deep Belief Network model to extract a feature, inputting the extracted feature into multiple DBN-Weighted Kernel Extreme Learning Machine (DBN-WKELM) base classifiers in a trained DBN-WKELM multiclass classifier model to obtain multiple initial classification results, calculating a weight of each DBN-WKELM base classifier by the self-adaptive weighted voting method, and obtaining a final classification results and an intrusion behavioral type corresponding to the final classification results according to multiple weights and initial classification results.

2. The method for detecting the intrusion in parallel according to claim 1, wherein step (1) comprises:
   (1-1) obtaining an unbalanced data set DS;
   (1-2) obtaining a sample point x and nearest neighbor data $D_k$ of the sample point x from the unbalanced data set DS obtained in step (1-1); wherein k represents a nearest neighbor parameter;
   (1-3) obtaining a set $N_k$ formed by all samples which have different type with the sample point x in the k-nearest neighbor data $D_k$ obtained in step (1-2) and a sample number num of the set $N_k$;
   (1-4) determining whether the sample number num obtained in step (1-3) is greater than or equal to k−1, proceeding to step (1-5) if yes, and otherwise, proceeding to step (1-6);
   (1-5) determining whether the type of the sample point x is a majority sample, updating the unbalanced data set DS to DS=DS−x and then proceeding to step (1-6) if yes, and otherwise, updating the unbalanced data set DS to DS=DS−$N_k$ and then proceeding to step (1-6);
   (1-6) repeating the above steps (1-2) to (1-5) for the remaining sample points in the unbalanced data set DS until all the sample points in the unbalanced data set DS has been processed, thereby obtaining the updated unbalanced data set DS;

(1-7) setting a counter i=1;

(1-8) determining whether i is equal to a total number of the sample points in the unbalanced data set DS, proceeding to step (1-14) if yes, and otherwise, proceeding to step (1-9);

(1-9) reading the i-th new sample point $d_i=(d_1^i, d_2^i, \ldots, d_n^i)$ from the unbalanced data set DS updated in step (1-6), determining whether a cluster set S of preferred setting is empty, proceeding to step (1-10) if yes, and otherwise, proceeding to step (1-11); wherein $e2 \in [1, n]$, $d_{e2}^i$: represents the e2-th feature attribute value in the i-th sample;

(1-10) initiating a sample point $d_i$ as a new cluster $C_{new}=\{d_i\}$, setting a centroid μ to $d_i$, adding the $C_{new}$ into the cluster set S, and proceeding to step (1-13);

(1-11) calculating a gravitation for $d_i$ of each cluster in the cluster set S to obtain a gravitation set $G=\{g_1, g_2, \ldots, g_{ng}\}$, and obtaining a maximum gravitation $g_{max}$ and its corresponding cluster $C_{max}$ from the gravitation set G, wherein $n_g$ represents a total number of the clusters in the cluster set S;

(1-12) determining whether the maximum gravitation $g_{max}$ is less than a determined threshold r, returning to step (1-10) if yes, and otherwise, merging the sample point $d_i$ into the cluster $C_{max}$, updating a centroid $\mu_{max}$ of the cluster $C_{max}$ which has merged the sample point $d_i$, and then proceeding to step (1-13);

(1-13) setting the counter to i=i+1, and returning to step (1-8); and (1-14) traversing all the clusters in the cluster set S, and determining whether the types of all the sample points in each cluster is a majority sample, saving the majority samples in the cluster randomly according to a sampling rate sr and repeating the traversing process for the remaining clusters if yes, and otherwise, repeating the traversing process for the remaining clusters.

3. The method for detecting the intrusion in parallel according to claim 1, wherein the gravitation g between the sample points $d_i$ and the clusters C is calculated according to the following formula:

$$g = \frac{\ln(\ln(C_{num}+1)) \cdot \ln(\ln 2)}{\left(\frac{1}{n}\sum_{e2=1}^{n} |d_{e2}^i - \mu_{e2}|\right)^2};$$

wherein $C_{num}$ is a number of the sample points in the cluster C, and $\mu_{e2}$ represents the e2-th feature attribute value in the centroid μ of the cluster C;

a formula for updating a centroid $\mu_{max}$ of a cluster $C_{max}$ is as follows:

$$\mu_{max} = \frac{1}{C_{maxn}} \sum_{p=1}^{C_{maxn}} d_p;$$

wherein $C_{maxn}$ is a number of the sample points in the cluster $C_{max}$ which has merged the sample point $d_i$, $d_p$ is the p-th sample point in the cluster $C_{max}$ which has merged the sample point $d_i$, and $p \in [1, C_{maxn}]$.

4. The method for detecting the intrusion in parallel according to claim 1, wherein the DBN model is trained by the steps:

(2-1) obtaining a DBN model, and optimizing the DBN model in a distributed memory computing platform using the improved differential evolution algorithm to obtain an optimized DBN model; and (2-2) training the DBN model optimized in step (2-1) to obtain a trained DBN model.

5. The method for detecting the intrusion in parallel according to claim 4, wherein step (2-1) comprises:

(2-1-1) obtaining a DBN model $w_{dbn}=\{W_1, W_2, \ldots, W_{dep}\}$; wherein dep represents a total number of hidden layers in the DBN model, $W_{di}$ represents a neuron number of the di-th hidden layer in the DBN model, and $di \in [1, 3]$;

(2-1-2) generating an initial population with a population scale of $n_{ps}$ structural vectors randomly, selecting one of the structural vectors randomly as the global optimal solution $x_{best}$ of the initial population from the initial population, writing the initial population into the Hadoop Distributed File System (HDFS) in the form of files, and setting a counter cnt=1;

(2-1-3) determining whether cnt is equal to a maximum iteration number Tor the global optimal solution $x_{best}$ is converged, outputting the global optimal solution, and causing the process to end if yes, and otherwise, proceeding to step (2-4);

(2-1-4) determining whether cnt is 1, reading the file written in the HDFS in step (2-1-2) from the HDFS, dividing the file written in the HDFS in step (2-1-2) into $n_{pa}$ input slices, and then proceeding to step (2-1-5) if yes, and otherwise, reading the updated file from the HDFS, dividing the updated file into $n_{pa}$ input slices, and then proceeding to step (2-1-5); wherein each input slice includes a sub-population;

(2-1-5) obtaining the j-th individual $x_{cnt}^j=\{W_{cnt,j}^1, W_{cnt,j}^2, \ldots, W_{cnt,j}^{dep}\}$ of the cnt-th generation in the sub-population as the neuron number in the DBN model for each sub-population obtained in step (2-1-4), obtaining a classification result of $n_t$ classification points according to the corresponding DBN model, calculating a classification error CE of the DBN model according to the classification result, and using the classification error CE as an adaptability value $f(x_{cnt}^j)$ of the j-th individual of the cnt-th generation in the sub-population; wherein $j \in [1,$ the total number of the individual of the cnt-th generation in the sub-population], and $w_{cnt,j}^{dep}$ represents the dep-th element of the j-th individual of the cnt-th generation in the sub-population;

(2-1-6) obtaining an adaptability value set $F=f\{x_{cnt}^1), f(x_{cnt}^2), \ldots, f(x_{cnt}^{sn})\}$ consisted of the adaptability value for all individuals of the cnt-th generation in the sub-population for each sub-population obtained in step (2-1-4), sorting all the adaptability value in the adaptability value set in ascending order to obtain a new adaptability value set $\acute{F}=\{\acute{f}(x_{cnt}^1), \acute{f}(x_{cnt}^2), \ldots, \acute{f}(x_{cnt}^{sn})\}$, using an individual corresponding to the minimum adaptability value in the new adaptability value set $\acute{F}$ as the optimal solution for the sub-population, and the minimum adaptability value as the best adaptability value for the sub-population; wherein sn is a total number of the adaptability value in the adaptability value set F;

(2-1-7) selecting the minimum value as the overall best adaptability value from the best adaptability value of all the sub-populations, and updating the global optimal solution $x_{best}$ to an individual corresponding to the overall best adaptability value;

(2-1-8) obtaining two individuals $x_{cnt}^1$ and $x_{cnt}^2$ with the minimum adaptability value to form a set $E_{cnt}\{x_{cnt}^1, x_{cnt}^2\}$ for the adaptability set F obtained in step (2-1-6), and causing the remaining individuals in the adaptability set F to form a set $I_{cnt}=\{x_{cnt}^3, \ldots, x_{cnt}^{sn}\}$;

(2-1-9) generating a self-adaptive mutated individual $\vec{w}_{cnt}^j$ according to the $\vec{j}$-th target individual $\vec{x}_{cnt}^j$ in the set $I_{cnt}$ obtained in step (2-1-8); wherein $\vec{j} \in [3, sn]$;

(2-1-10) performing a crossover operation on the self-adaptive mutated individual $\vec{w}_{cnt}^j$ obtained in step (2-1-9) and the $\vec{j}$-th target individual $\vec{x}_{cnt}^j$ in the set $I_{cnt}$ obtained in step (2-1-8) to generate experimental individual $u_{cnt}^j = \{u_{cnt,\vec{j}}^1, u_{cnt,\vec{j}}^2, \ldots, u_{cnt,\vec{j}}^D\}$;

(2-1-11) obtaining an adaptability value $f(\vec{x}_{cnt}^j)$ corresponding to the experimental individual $u_{cnt}^j$ obtained in step (2-1-10) and an adaptability value $f(u_{cnt}^j)$ corresponding to the target individual $x_{cnt}^j$ obtained in step (2-1-9), using a smaller adaptability value to replace the corresponding individual in the set $I_{cnt}$, and adding the individual of the set $E_{cnt}$ obtained in step (2-8) to $I_{cnt}$, thereby obtaining a updated set $I_{cnt}$; and (2-1-12) setting the counter to cnt=cnt+1, saving the updated set $I_{cnt}$ on the HDFS, and returning to step (2-1-3).

6. The method for detecting the intrusion in parallel according to claim 5, wherein the classification error is obtained by a formula as follows:

$$CE = \frac{1}{n_t} \sum_{i_t=1}^{n_t} |Y_{i_t} - Y'_{i_t}|$$

wherein $Y_{i_t}$ is a real result, $\hat{Y}_{i_t}$ is a classification result, $n_t$ is a number of the classification points;

a formula for generating the self-adaptive mutated individual is as follows:

$$\vec{w}_{cnt}^j = \vec{x}_{cnt}^{j_1} + F_c(\vec{x}_{cnt}^{j_2} - \vec{x}_{cnt}^{j_3})$$

wherein $\vec{j}_1, \vec{j}_2,$ and $\vec{j}_3 \in [3, sn]$, these three are different from each other and not equal to $\vec{j}$, and $F_c$ is a self-adaptive mutation factor;

a formula for calculating the self-adaptive mutation factor $F_c$ is as follows:

$$F_c = f\cos\left(\frac{\pi}{2} \times \frac{2(T-cnt)}{T}\right)$$

wherein f is an initial mutation factor;

a formula for generating the experimental individual is as follows:

$$u_{cnt,\vec{j}}^h = \begin{cases} w_{cnt,\vec{j}}^h & rand \leq CR \text{ or } h = randn \\ x_{cnt,\vec{j}}^h & rand > CR \text{ or } h \neq randn \end{cases}$$

wherein randn is a random integer generated randomly from $\{1, 2, \ldots, D\}$, rand is a uniformly distributed random real number within $[0, 1]$, CR is a crossover factor, and D is an individual genetic dimension; $h \in [1, D]$.

7. The method for detecting the intrusion in parallel according to claim 4, wherein step (2-2) comprises:

(2-2-1) dividing the unbalanced data set clustered in step (1) into a training set and a test set according to a ratio of 6:4;

(2-2-2) setting a counter cnt2=1;

(2-2-3) setting an initial state of an input layer of the DBN model optimized in step (2) as a training sample of the training set according to the training set obtained in step (2-2-1), constructing the input layer and the first hidden layer of the DBN model as the Restricted Boltzmann Machine (RBM) network, and initializing a weight W, an offset a of the input layer, and an offset b of the first hidden layer between the input layer and the first hidden layer of the RBM network;

(2-2-4) determining whether cnt2 is equal to 3, causing the process to end if yes, and otherwise, proceeding to step (2-2-5);

(2-2-5) updating the input value of the RBM network, the weight W, the offset a of the input layer, and the offset b of the cnt2-th hidden layer between the input layer and the cnt2-th hidden layer of the RBM network using the Contrastive Divergence (CD) algorithm;

(2-2-6) performing the iterative training on the RBM network updated in step (2-2-6) until a reconstruction error of the RBM network reaches the minimum, thereby obtaining an RBM model after overall iterative training; adding the (cnt2+1)-th hidden layer of the DBM model optimized in step (2) into the RBM network after overall iterative training to construct a new RBM network, and updating the weight W between the input layer and the (cnt2+1)-th hidden layer of the new DBM network to a weight output by the RBM network after overall iterative training; updating the offset a of the input layer and the offset b of the (cnt2+1)-th hidden layer respectively to an offset output by the RBM network after overall iterative training, and using an output value of the RBM network after overall iterative training as an input value for the new RBM network; and (2-2-7) setting the counter to cnt2=cnt2+1, and returning to step (2-2-4).

8. The method for detecting the intrusion in parallel according to claim 1, wherein the DBN-WKELM multiclass classifier model is trained by the following process:

obtaining a trained DBN model, starting four sub-threads, and setting an output value of the trained DBN model to an input value $X_{in}$ of the WKELM hidden layer in each sub-thread; obtaining a cost-sensitive matrix $W_{cs}$ by weighting the input value $X_{in}$; obtaining an output weight β of the WKELM hidden layer according to the cost-sensitive matrix $W_{cs}$, and obtaining the DBN-WKELM base classifier based on feature extraction of the DBN based on the output weight β; wherein the trained DBN-WKELM multiclass classifier model is consisted of the four DBN feature extraction based DBN-WKELM base classifiers.

9. The method for detecting the intrusion in parallel according to claim 8, wherein a formula for the output weight β of the WKELM hidden layer is:

$$\beta = \left(\frac{1}{C_r} W_{cs}^{-1} + \Omega\right)^{-1} T_l$$

wherein $C_r$ is a regularization coefficient, $\Omega$ is a kernel matrix corresponding to a kernel function $F_k$ of the WKELM base classifier, and $T_1$ is a data label corresponding to the input value $X_{in}$;

a formula for calculating a weight of a self-adaptive weighted voting method is as follows:

$$W_q = \frac{x_{ac}^q - x_{fp}^q}{\sum_{q=1}^{m}(x_{ac}^q - x_{fp}^q)}$$

wherein $W_q$ is a voting weight of the q-th DBN-WKELM base classifier in the DBN-WKELM multiclass classifier model, $x_{ac}^q$ is a classification accuracy of the q-th DBN-WKELM base classifier, is a classification false-positive rate of the q-th DBN-WKELM base classifier, and $q \in [1, m]$; and a formula for calculating the classification accuracy and false-positive rate of the q-th DBN-WKELM base classifier is as follows:

$$x_{ac}^q = \frac{n_c^q}{N_s^q}, x_{fp}^q = \frac{n_f^q}{N_c^q}$$

wherein $n_c^q$ is a number of the samples classified correctly in the q-th DBN-WKELM base classifier, $N_s^q$ is a total number of samples in the q-th DBN-WKELM base classifier, $n_f^q$ is a number of normal samples mistaken regarded as intrusion in the q-th DBN-WKELM base classifier, and $N_c^q$ is a total number of normal samples in the q-th DBN-WKELM base classifier.

10. A system for detecting an intrusion in parallel based on an unbalanced data Deep Belief Network (DBN), comprising:

a first module, configured to obtain an unbalanced data set, under-sample the unbalanced data set using the Neighborhood Cleaning Rule algorithm, and cluster the under-sampled unbalanced data set using the Gravity-based Clustering Approach algorithm to obtain the clustered unbalanced data set; and a second module, configured to input the clustered unbalanced data obtained in the first module into a trained Deep Belief Network model to extract a feature, input the extracted feature into multiple DBN-Weighted Kernel Extreme Learning Machine (DBN-WKELM) base classifiers in a trained DBN-WKELM multiclass classifier model to obtain multiple initial classification results, calculate a weight of each DBN-WKELM base classifier by the self-adaptive weighted voting method, and obtain a final classification result and an intrusion behavioral type corresponding to the final classification result according to multiple weights and initial classification results.

* * * * *